United States Patent
Lee

(10) Patent No.: US 9,254,784 B2
(45) Date of Patent: Feb. 9, 2016

(54) HEAD LAMP APPARATUS OF AUTOMOBILE AND METHOD OF CONTROLLING THE SAME

(71) Applicant: HYUNDAI MOBIS Co.,Ltd, Yongin-si, Gyeonggi-do (KR)

(72) Inventor: Tae won Lee, Yongin-si (KR)

(73) Assignee: HYUNDAI MOBIS CO., LTD, Yongin-si, Gyeonggi-do (KR)

( * ) Notice: Subject to any disclaimer, the term of this patent is extended or adjusted under 35 U.S.C. 154(b) by 266 days.

(21) Appl. No.: 13/847,006

(22) Filed: Mar. 19, 2013

(65) Prior Publication Data

US 2013/0241411 A1    Sep. 19, 2013

(30) Foreign Application Priority Data

Mar. 19, 2012    (KR) .................. 10-2012-0027745

(51) Int. Cl.
*B60Q 1/26*    (2006.01)
*B60Q 1/08*    (2006.01)
*B60Q 1/12*    (2006.01)
*B60Q 1/18*    (2006.01)

(52) U.S. Cl.
CPC .. *B60Q 1/08* (2013.01); *B60Q 1/12* (2013.01); *B60Q 1/18* (2013.01); *B60Q 2300/112* (2013.01); *B60Q 2300/122* (2013.01); *B60Q 2300/32* (2013.01); *B60Q 2300/336* (2013.01)

(58) Field of Classification Search
CPC ....... B60Q 1/12; B60Q 2300/112; B60Q 1/08
USPC ..................................... 315/79; 362/465–466
See application file for complete search history.

(56) References Cited

U.S. PATENT DOCUMENTS

| | | | |
|---|---|---|---|
| 2002/0036907 A1* | 3/2002 | Kobayashi et al. | 362/464 |
| 2004/0114379 A1* | 6/2004 | Miller et al. | 362/464 |
| 2005/0047151 A1* | 3/2005 | Van Duyn | 362/464 |
| 2013/0241411 A1 | 9/2013 | Lee | |

FOREIGN PATENT DOCUMENTS

| | | |
|---|---|---|
| CN | 1227172 A | 9/1999 |
| CN | 101224724 A | 7/2008 |
| JP | 2000-062522 A | 2/2000 |
| KR | 10-0151509 B1 | 10/1998 |
| KR | 10-2013-0106100 A | 9/2013 |

* cited by examiner

*Primary Examiner* — Sibin Chen
*Assistant Examiner* — Metasebia Retebo
(74) *Attorney, Agent, or Firm* — Paratus Law Group, PLLC

(57) ABSTRACT

The present invention relates to a head lamp apparatus of an automobile and a method of controlling the same, and the head lamp apparatus of the automobile includes: left and right static bend lights (SBL) for lighting to a left or right side of a driving direction of the automobile; an automobile speed sensing sensor; a global positioning system (GPS); and a controller configured to turn on at least one of the left SBL and the right SBL when the driving speed of the automobile sensed by the automobile speed sensing sensor is equal to or smaller than a reference speed when the driving position of the automobile unit is a predetermined position to enter a crossroad so that a time at which the SBL is turned on is controlled by reflecting the reference speed when the automobile enters the crossroad, thereby improving visibility of a driver at the crossroad.

20 Claims, 3 Drawing Sheets

HEAD LAMP APPARATUS OF AUTOMOBILE AND METHOD OF CONTROLLING THE SAME

CROSS-REFERENCE TO RELATED APPLICATIONS

The present application claims priority to Korean Patent Application Number 10-2012-0027745 filed Mar. 19, 2012, the entire contents of which the application is incorporated herein for all purposes by this reference.

TECHNICAL FIELD

The present invention relates to a head lamp apparatus of an automobile and a method of controlling the same, and more particularly, to a static bend light (SBL) apparatus of an automobile, which obliquely lights in left and right directions with respect to a driving direction of an automobile in order to secure visibility of a driver at a crossroad during driving of the automobile, and a method of controlling the same.

BACKGROUND

In general, a head lamp and a taillamp are installed in an automobile in order to brightly light an outside area to secure a clear view in a position where a clear view is not secured, and a turn signal lamp for notifying neighboring automobile drivers of a lane change and a driving direction, or a hazardous situation is installed in the automobile.

Among them, the head lamp provides a high beam mode for securing a clear view by lighting a far distance, and a low beam mode for preventing a driver of an automobile driving in a front side and a driver of an opposite automobile from being blinded by using a low beam light.

Further, a head lamp, which recognizes a state of surroundings of an automobile through a camera sensor and a controller so that a pattern of light is automatically changed to the high beam mode and the low beam mode, has been released, and a head lamp, which is rotated so as to light in a driving direction of an automobile by changing an irradiation direction of light of the head lamp according to a rotation angle of a steering wheel, has been also released.

In the meantime, a static bend light (SBL) obliquely lighting with respect to the driving direction of an automobile is recently further installed at the head lamp to light a crosswalk before an automobile enters a crossroad, so that it is possible to secure visibility of a driver at a crossroad and decrease an accident risk of a pedestrian. However, the SBL according to the related art has a problem in that the SBL is excessively turned on fast or late when the automobile enters the crossroad.

SUMMARY

The present invention has been made in an effort to provide a head lamp apparatus of an automobile, which improves visibility of a driver at a crossroad when the automobile enters the crossroad, and a method of controlling the same.

Objects of the present invention are not limited to the objects described above, and other objects that are not described will be clearly understood by a person skilled in the art from the description below.

An exemplary embodiment of the present invention provides a head lamp apparatus of an automobile, including: a left static bend light (SBL) for lighting a left side of a driving direction of the automobile; a right static bend light (SBL) for lighting the right side of the driving direction of the automobile; an automobile speed sensing sensor configured to sense a driving speed of the automobile; a global positioning system (GPS) receiving unit configured to receive a driving position of the automobile; and a controller configured to turn on at least one of the left SBL and the right SBL when the driving speed of the automobile sensed by the automobile speed sensing sensor is equal to or smaller than a reference speed when the driving position of the automobile received by the GPS receiving unit is a predetermined position to enter a crossroad.

Another exemplary embodiment of the present invention provides a method of controlling a head lamp apparatus of an automobile, in which a left static bend light (SBL) for lighting a left side of a driving direction of the automobile and a right static bend light (SBL) for lighting the right side of the driving direction are installed, the method including: a first operation of sensing a driving speed of the automobile; a second operation of receiving a driving position of the automobile; and a third operation of turning on at least one of the left SBL and the right SBL when the driving speed of the automobile sensed in the first operation is equal to or smaller than a reference speed when the driving position of the automobile received in the second operation is a predetermined position to enter a crossroad.

Details of other exemplary embodiments are included in the detailed description and the drawings.

According to the head lamp apparatus of the automobile and the method of controlling the same according to the present invention, it is possible to turn on the left SBL and the right SBL by reflecting the driving speed of the automobile, thereby improving visibility of a driver when the automobile enters the crossroad.

Further, it is possible to turn on the left SBL and the right SBL according to a relative distance reflecting the driving speed of the automobile, not the absolute distance from the driving position of the automobile to the crossroad, thereby improving visibility of a driver.

Further, it is possible to select one of the left SBL and/or the right SBL before the automobile enters the crossroad and turn on the selected SBL in the direction of the driving path linked with the map data stored in the map data storing unit, thereby decreasing unnecessary power consumption.

The effects of the present invention are not limited to the effects described above, and a person of ordinary skill in the art will clearly understand other effects that are not described from the description of the scope of the claims.

DETAILED DESCRIPTION

Figure 1:
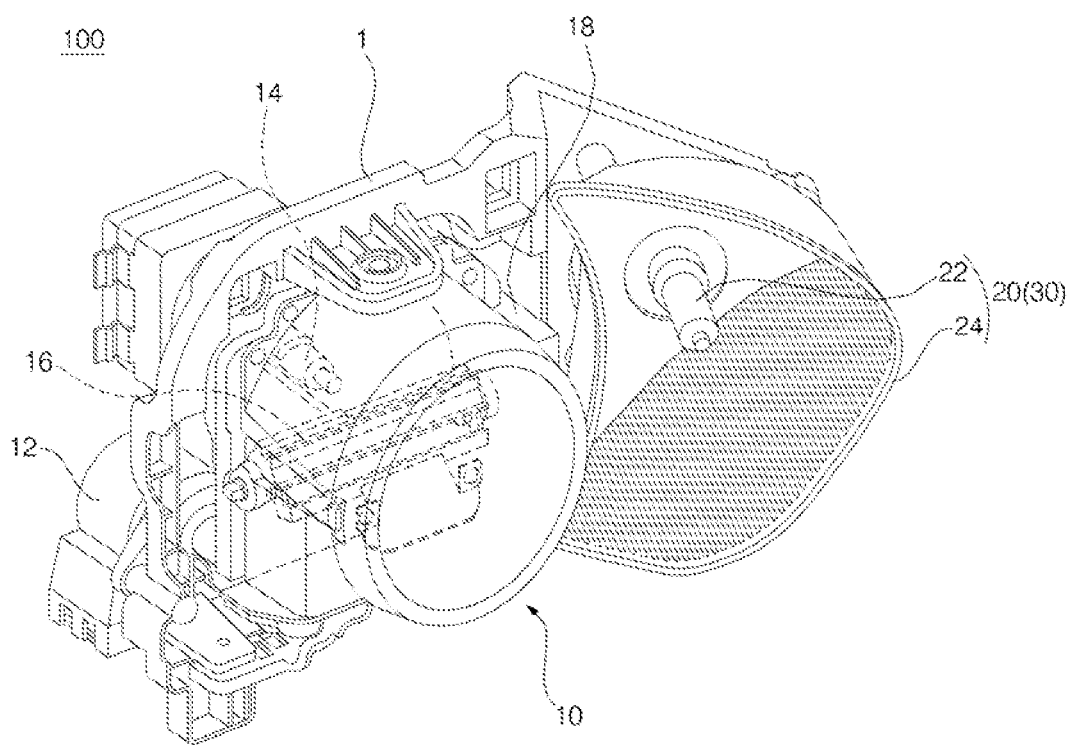
FIG. 1 is a view illustrating a head lamp installed in an automobile according to an exemplary embodiment of the present invention.

The advantages and characteristics of the present invention and methods for achieving the same will become clear from the embodiments set forth in detail below with reference to the attached drawings. However, the present invention is not limited to the embodiments set forth below, and may be embodied in various other forms. The present embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals represent like elements throughout the specification.

Hereinafter, a head lamp apparatus of an automobile and a method of controlling the same according to an exemplary embodiment of the present invention will be described with respect to the drawings.

FIG. 1 is a view illustrating a head lamp installed in an automobile according to an exemplary embodiment of the present invention.

Referring to FIG. 1, a head lamp 100 is installed at a front side of an automobile according to the exemplary embodiment of the present invention. The head lamp 100 includes a dynamic bend light (DBL) 10 lighting in a driving direction of the automobile, and a static bend light (SBL) 20 or 30 obliquely lighting with respect to the driving direction of the automobile.

The DBL 10 is rotatably coupled to a support bracket 1, and is connected with an intelligent step motor (ISM) 12, to light in the driving direction of the automobile while rotating to left and right sides of the automobile by rotation force of the ISM 12. The DBL 10 includes a light source 14 shaped like a bulb generating light, and a shield 16 for blocking a part of light distributed from the light source 14 to the outside is disposed in a front side thereof. The shield 16 is connected with a smart shield actuator (SSA) 18 to block the part of the light distributed to the outside while rotating by rotation force of the SSA 18, thereby changing a pattern of light distributed to the outside of the automobile according to a situation of the outside of the automobile (for example, presence or non-presence of a preceding automobile and an opposite automobile).

The SBL 20 or 30 is fixedly installed in the support bracket 1. The SBL 20 or 30 includes a light source 22 shaped like a bulb generating light, and a reflector 24 for receiving the light source 22 therein and reflecting light generated from the light source 22 to the outside. The SBL 20 or 30 is obliquely installed in the support bracket 1 so as to obliquely light with respect to the driving direction of the automobile.

One head lamp 100 is installed at a front-left side of the automobile, and the other head lamp 100 is installed in a front-right side of the automobile. Accordingly, the SBLs 20 and 30 are disposed at the front left side and the front-right side of the automobile, respectively, so that one SBL obliquely lights a left side of the driving direction of the automobile, and the other SBL obliquely lights a right side of the driving direction of the automobile. That is, although one head lamp 100 is illustrated in the drawing, the SBLs 20 and 30 include the left SBL 20 for obliquely lighting the left side of the driving direction of the automobile and the right SBL 30 for obliquely lighting the right side of the driving direction of the automobile.

The left SBL 20 and the right SBL 30 are turned on before the automobile enters the crossroad, to light the crosswalks provided at left and right sides of the crossroad. Accordingly, visibility of the driver is secured, thereby preventing a crash accident with a pedestrian. Especially, the automobile according to the exemplary embodiment of the present invention turns on the left SBL 20 and the right SBL 30 by reflecting a driving speed of the automobile, so that the visibility of the driver is improved. This will be described in detail below.

Figure 2:
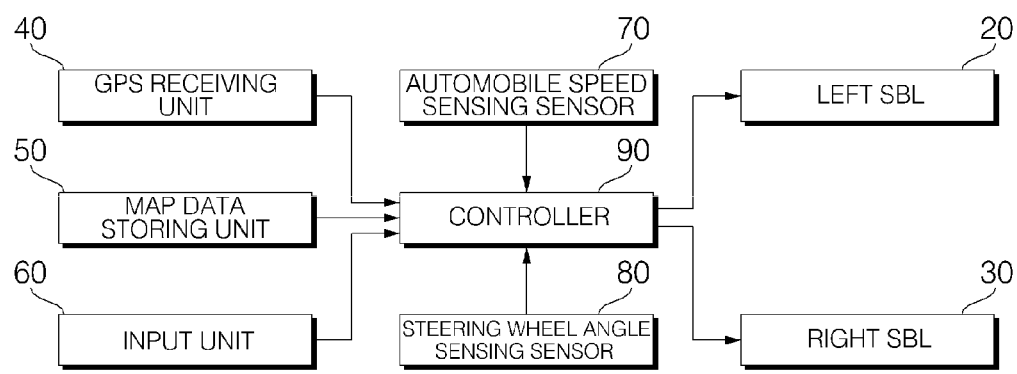
FIG. 2 is a block diagram of the head lamp apparatus of the automobile according to the exemplary embodiment of the present invention.

FIG. 2 is a block diagram of the head lamp apparatus of the automobile according to the exemplary embodiment of the present invention.

Referring to FIGS. 1 and 2, the head lamp apparatus of the automobile according to the exemplary embodiment of the present invention further includes a global positioning system (GPS) receiving unit 40, a map data storing unit 50, an input unit 60, an automobile speed sensing sensor 70, a steering wheel angle sensing sensor 80, and a controller 90.

The GPS receiving unit 40, the map data storing unit 50, and the input unit 60 may be integrated as a navigation included in the automobile.

The GPS receiving unit 40 receives a driving position of the automobile by receiving current coordinates from a GPS. The GPS receiving unit 40 transmits the driving position of the automobile to the controller 90. Here, the controller 90 may be an electronic control unit (ECU) that is a representative control device of the automobile.

Map data is stored in the map data storing unit 50.

The input unit 60 is manipulated by the driver, so that a destination of the automobile is input in the input unit 60, and the input destination of the automobile is transmitted to the controller 90.

The automobile speed sensing sensor 70 senses a driving speed of the automobile and transmits the sensed driving speed to the controller 90.

The steering wheel angle sensing sensor 80 senses a steering wheel angle (SWA) of a steering wheel (not illustrated), which is a steering handle of the automobile, and transmits the sensed steering wheel angle to the controller 90.

When the driving position received by the GPS receiving unit 40 is a predetermined position to enter the crossroad, and the driving speed of the automobile sensed by the automobile speed sensing sensor 70 is equal to or lower than a reference speed, the controller 90 turns on at least one of the left SBL 20 and the right SBL 30. In the present exemplary embodiment, the reference speed is set to 40 km/h in the controller 90. That is, when the driving position of the automobile is a predetermined position to enter the crossroad, and the driving speed of the automobile is equal to or lower than 40 km/h, the controller 90 turns on at least one of the left SBL 20 and the right SBL 30. Here, the reference speed may be set to a speed different from 40 km/h.

Since data on the predetermined position to enter the crossroad by the automobile is set in the controller 90 in advance, when the driving position received by the GPS receiving unit 40 is the set position, the controller 90 determines that the automobile may enter the crossroad, and when the driving speed of the automobile is equal to or lower than the reference speed, the controller 90 turns on at least one of the left SBL 20 and the right SBL 30.

The predetermined position of the automobile to enter the crossroad is a position from which the automobile arrives at the crossroad at the driving speed sensed by the automobile speed sensing sensor 70 within a reference time. Here, the reference time is 3.5 seconds, which is set in the controller 90 in the exemplary embodiment of the present invention. That is, at least one of the left SBL 20 and the right SBL 30 is turned on at a position from which the automobile arrives at the crossroad at the driving speed sensed by the automobile speed sensing sensor 70 within 3.5 seconds, so that the left SBL 20 and the right SBL 30 are turned on according to a relative distance reflecting the driving speed of the automobile, not an absolute distance from the driving position of the automobile to the crossroad, thereby improving visibility of the driver. Here, the reference time may be set to a time different from 3.5 seconds.

The controller 90 turns on at least one of the left SBL 20 and the right SBL 30, and then when the driving speed of the automobile sensed by the automobile speed sensing sensor 70 exceeds the reference speed of 40 km/h, the controller 90 turns off the turned-on one between the left SBL 20 and the right SBL 30. That is, when the driving speed of the automobile sensed by the automobile speed sensing sensor 70 exceeds the reference speed of 40 km/h, the controller 90 determines that the automobile passes through the crossroad, and turns off the turned-on one between the left SBL 20 and the right SBL 30.

Further, after the controller 90 turns on at least one of the left SBL 20 and the right SBL 30, when the driving speed sensed by the automobile speed sensing sensor 70 is equal to or lower than the reference speed of 40 km/h, the driving position received by the GPS receiving unit 40 is a predetermined position after passing through the crossroad, and the steering wheel angle sensed by the steering wheel angle sensing sensor 80 is equal to or smaller than a reference angle, the controller 90 turns off the turned-on one between the left SBL 20 and the right SBL 30. In the present exemplary embodiment, the reference angle is 20 degrees, which is set in the controller 90. Data on the predetermined position after passing through the crossroad may be set in the controller 90 in advance. Here, the reference angle may be set to an angle different from 20 degrees.

In the meantime, the controller 90 may extract data on the crossroad from the map data stored in the map data storing unit 50.

When the destination is input in the input unit 60, the controller 90 maps a driving path from the driving position of the automobile received by the GPS receiving unit 40 to the destination input in the input unit 60 with the map data stored in the map data storing unit 50 to set the driving path.

When the driving path is a left turn at the crossroad, the controller 90 turns on only the left SBL 20. The controller 90 turns on only the left SBL 20, and then when the driving speed of the automobile sensed by the automobile speed sensing sensor 70 exceeds the reference speed of 40 km/h, the controller 90 may determine that the automobile passes through the crossroad, and turn off the left SBL 20. Further, after the controller 90 turns on only the left SBL 20, when the driving speed of the automobile sensed by the automobile speed sensing sensor 70 is equal to or lower than the reference speed of 40 km/h, the driving position of the automobile received by the GPS receiving unit 40 is the predetermined position after passing through the crossroad, and the steering wheel angle sensed by the steering wheel angle sensing sensor 80 is equal to or smaller than the reference angle, that is, 20 degrees, the controller 90 may determine that the automobile passes through the crossroad and turn off the left SBL 20.

When the driving path is a right turn at the crossroad, the controller 90 turns on only the right SBL 30. After the controller 90 turns on only the right SBL 30, when the driving speed of the automobile sensed by the automobile speed sensing sensor 70 exceeds the reference speed of 40 km/h, the controller 90 may determine that the automobile passes through the crossroad, and turn off the right SBL 30. Further, after the controller 90 turns on only the right SBL 30, when the driving speed of the automobile sensed by the automobile speed sensing sensor 70 is equal to or lower than the reference speed of 40 km/h, the driving position of the automobile received by the GPS receiving unit 40 is the predetermined position after passing through the crossroad, and the steering wheel angle sensed by the steering wheel angle sensing sensor 80 is equal to or smaller than the reference angle, that is, 20 degrees, the controller 90 may determine that the automobile passes through the crossroad and turn off the right SBL 30.

When the driving path is straight driving at the crossroad, the controller 90 turns on all of the left SBL 20 and the right SBL 30. When the reference time elapses after the automobile passes through the crossroad, the controller 90 turns off all of the left SBL 20 and the right SBL 30. Here, the reference time is set to 3 seconds in the controller 90. That is, when the driving path is straight driving at the crossroad, the controller 90 turns on all of the left SBL 20 and the right SBL 30, and when 3 seconds elapses after the automobile passes through the crossroad, the controller 90 turns off all of the left SBL 20 and the right SBL 30. Here, the reference time may be set to a time different from 3 seconds.

Figure 3:
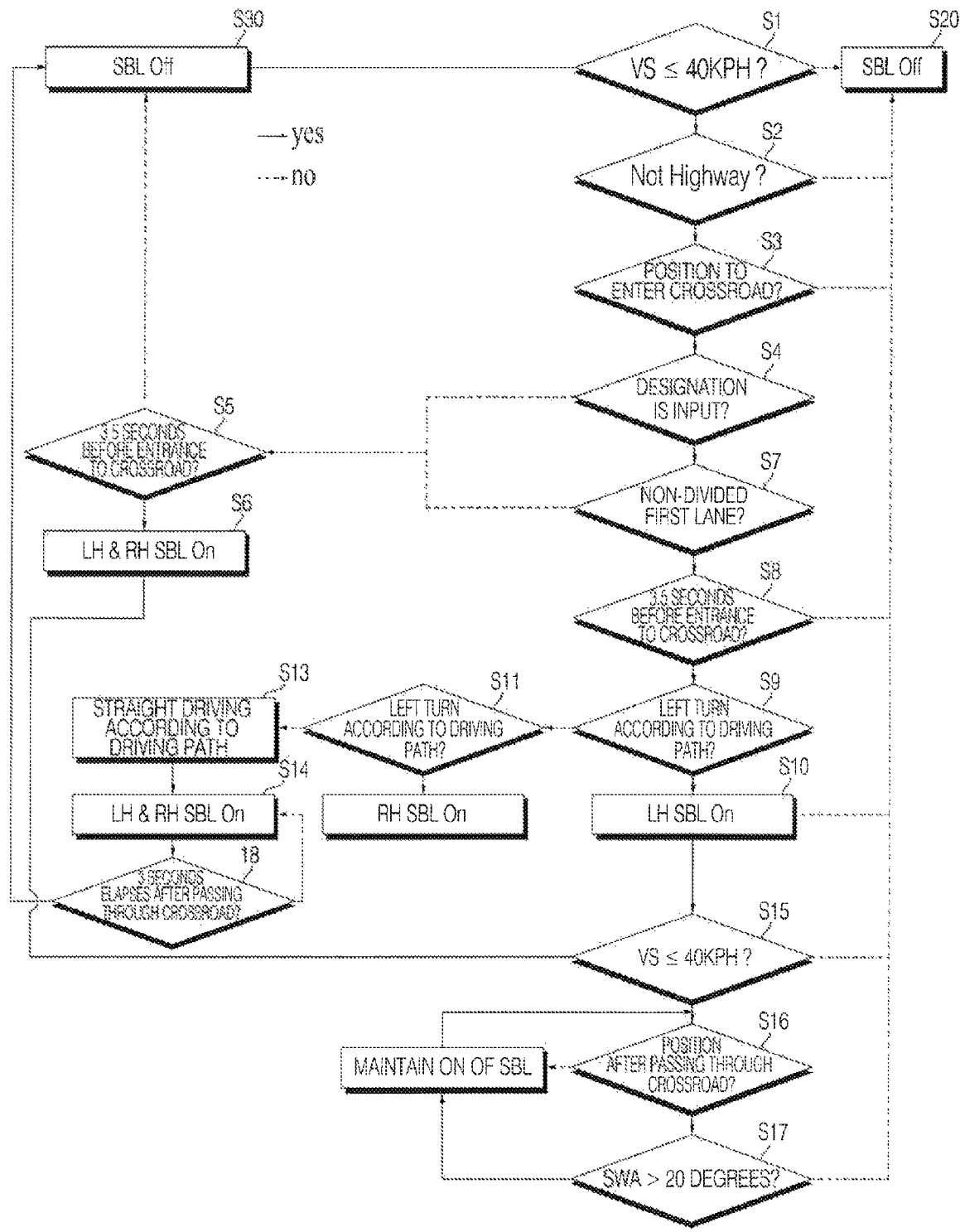
FIG. 3 is a flowchart of a method of controlling the head lamp apparatus of the automobile according to the exemplary embodiment of the present invention.

FIG. 3 is a flowchart of a method of controlling the head lamp apparatus of the automobile according to the exemplary embodiment of the present invention. Here, the method of controlling the head lamp apparatus of the automobile according to the exemplary embodiment of the present invention will be described in connection with the operation of the head lamp apparatus of the automobile according to the exemplary embodiment of the present invention.

Referring to FIGS. 1 to 3, the automobile drives on a general road, not at the crossroad, during night drive while turning on the DBL 10, and turning off the left SBL 20 and the right SBL 30. During the driving, the automobile speed sensing sensor 70 senses the driving speed of the automobile, the GPS receiving unit 40 receives the driving position of the automobile, and the steering wheel angle sensing sensor 80 senses a steering wheel angle of the steering wheel.

The controller 90 determines whether the driving speed of the automobile sensed by the automobile speed sensing sensor 70 is equal to or lower than the reference speed of 40 km/h (S1), and when the speed of the automobile sensed by the automobile speed sensing sensor 70 exceeds the reference speed of 40 km/h, the controller 90 maintains the turned-off state of the left SBL 20 and the right SBL 30 without turning on the left SBL 20 and the right SBL 30 (S20).

Then, the controller 90 determines whether the driving position of the automobile received by the GPS receiving unit 40 is a highway (S2), and when the driving position of the automobile received by the GPS receiving unit 40 is the highway, there is no crossroad, so that the controller 90 maintains the turned-off state of the left SBL 20 and the right SBL 30 without turning on the left SBL 20 and the right SBL 30 (S20).

Then, the controller 90 determines whether the driving position of the automobile received by the GPS receiving unit 40 is a predetermined position to enter the crossroad (S3), and when the driving position of the automobile received by the GPS receiving unit 40 is not the predetermined position to enter the crossroad, the controller 90 maintains the turned-ff state of the left SBL 20 and the right SBL 30 without turning on the left SBL 20 and the right SBL 30 (S20). Here, the data on the crossroad may be data preset in the controller 90, and may be data extracted from the map data stored in the map data storing unit 50.

Then, the controller 90 determines whether a destination is input in the input unit 60 (S4). When the destination is input in the input unit 60, the controller 90 maps a driving path from the driving position of the automobile received by the GPS receiving unit 40 to the destination with the map data stored in the map data storing unit 50 to set the driving path.

When the destination is not input in the input unit 60, the controller 90 determines whether the driving position of the automobile received by the GPS receiving unit 40 is a position from which the automobile may enter the crossroad at the driving speed of the automobile sensed by the automobile speed sensing sensor 70 within the reference time of 3.5 seconds (S5), and when 3.5 seconds elapses, the controller 90 maintains the turned-off state of the left SBL 20 and the right SBL 30 without turning on the left SBL 20 and the right SBL 30 (S30), and when the time is not equal to or lower than 3.5 seconds, the controller 90 turns on all of the left SBL 20 and the right SBL 30 (S6).

After the controller 90 turns on all of the left SBL 20 and the right SBL 30 as described above (S6), the controller 90 determines whether the driving speed of the automobile sensed by the automobile speed sensing sensor 70 is equal to or lower than the reference speed of 40 km/h (S15), and when the driving speed of the automobile sensed by the automobile speed sensing sensor 70 exceeds 40 km/h, the controller 90 determines that the automobile passes through the crossroad, and turns off all of the left SBL 20 and the right SBL 30 (S20).

Then, the controller 90 determines whether the driving speed is equal to or lower than 40 km/h, and whether the driving position of the automobile sensed by the GPS receiving unit 40 is a predetermined position after passing through the crossroad (S16), and when the driving position of the automobile is not the position after passing through the crossroad, the controller 90 maintains the turned-on state of the left SBL 20 and the right SBL 30 without turning off the left SBL 20 and the right SBL 30 (S40). Further, when the driving position of the automobile is the position after passing through the crossroad, the controller 90 determines whether the steering wheel angle exceeds the reference angle of 20 degrees (S17), and when the steering wheel angle of the steering wheel sensed by the steering wheel angle sensing sensor 80 exceeds the reference angle of 20 degrees, the controller maintains the turned-on state of the left SBL 20 and the right SBL 30 without turning off the left SBL 20 and the right SBL 30 (S40), and when the steering wheel angle is equal to or lower than the reference angle of 20 degrees, the controller 90 turns off the left SBL 20 and the right SBL 30 (S20).

In the meantime, after the controller 90 maps the driving path with the map data according to the input of the destination in the input unit 60 and sets the driving path, the controller 90 determines whether the driving position of the automobile received by the GPS receiving unit 40 is a non-divided first lane (S7).

When the driving position of the automobile received by the GPS receiving unit 40 is the non-divided first lane, the controller 90 determines whether the driving position of the automobile is a position from which the automobile enters the crossroad at the driving speed of the automobile sensed by the automobile speed sensing sensor 70 within the reference time of 3.5 seconds (S5), and when 3.5 seconds elapses, the controller 90 maintains the turned-off state of the left SBL 20 and the right SBL 30 without turning on the left SBL 20 and the right SBL 30 (S40), and when the time is equal to or lower than 3.5 seconds, the controller 90 turns on all of the left SBL 20 and the right SBL 30 (S6).

Similarly, after the controller 90 turns on all of the left SBL 20 and the right SBL 30 (S6), the controller 90 determines whether the driving speed of the automobile sensed by the automobile speed sensing sensor 70 is equal to or lower than the reference speed of 40 km/h (S15), and when the driving speed of the automobile sensed by the automobile speed sensing sensor 70 exceeds 40 km/h, the controller 90 determines that the automobile passes through the crossroad and turns off all of the left SBL 20 and the right SBL 30 (S20).

In the meantime, when the driving speed of the automobile sensed by the automobile speed sensing sensor 70 is equal to or lower than 40 km/h, the controller 90 determines whether the driving position of the automobile sensed by the GPS receiving unit 40 is the predetermined position after passing through the crossroad (S16), and when the driving position of the automobile sensed by the GPS receiving unit 40 is not the position after passing through the crossroad, the controller 90 maintains the turned-on state of the left SBL 20 and the right SBL 30 without turning off the left SBL 20 and the right SBL 30 (S40), and when the driving position of the automobile sensed by the GPS receiving unit 40 is the position after passing through the crossroad, the controller 90 determines whether the steering wheel angle of the steering wheel sensed by the steering wheel angle sensing sensor 80 exceeds the reference angle of 20 degrees (S17), and when the steering wheel angle of the steering wheel sensed by the steering wheel angle sensing sensor 80 exceeds the reference angle of 20 degrees, the controller 90 maintains the turned-on state of the left SBL 20 and the right SBL 30 without turning off the left SBL 20 and the right SBL 30 (S40), and when the steering wheel angle of the steering wheel sensed by the steering wheel angle sensing sensor 80 is equal to or smaller than 20 degrees, the controller 90 turns off all of the left SBL 20 and the right SBL 30 (S20).

In the meantime, when the driving position of the automobile received by the GPS receiving unit 40 is not the non-divided first lane, the controller 90 determines whether the driving position of the automobile is the position from which the automobile enters the crossroad at the driving speed of the automobile sensed by the automobile speed sensing sensor 70 within the reference time of 3.5 seconds (S8), and when 3.5 seconds elapses, the controller 90 maintains the turned-off state of the left SBL 20 and the right SBL 30 without turning on the left SBL 20 and the right SBL 30 (S20), and when the time is equal to or shorter than 3.5 seconds, the controller 90 turns on at least one of the left SBL 20 and the right SBL 30 according to the driving path.

That is, the controller 90 determines whether the driving path is a left turn at the crossroad (S9), and when the driving path is the left turn at the crossroad, the controller 90 turns on only the left SBL 20 (S10), and when the driving path is not the left turn at the crossroad, the controller 90 determines that the driving path is a right turn at the crossroad (S11). When the driving path is the right turn at the crossroad, the controller 90 turns on only the right SBL 30 (S12), and when the driving path is not the right turn at the crossroad, the controller 90 determines that the driving path is straight at the crossroad and turns on all of the left SBL 20 and the right SBL 30 (S14).

After the controller 90 turns on the left SBL 20 (S10), the controller 90 determines whether the driving speed of the automobile sensed by the automobile speed sensing sensor 70 is equal to or lower than the reference speed of 40 km/h (S15), and when the driving speed of the automobile sensed by the automobile speed sensing sensor 70 exceeds 40 km/h, the controller 90 determines that the automobile passes through the cross road and turns off the left SBL 20 (S20).

In the meantime, when the driving speed of the automobile sensed by the automobile speed sensing sensor 70 is equal to or smaller than 40 km/h, the controller 90 determines whether the driving position of the automobile sensed by the GPS receiving unit 40 is the predetermined position after passing through the crossroad (S16), and when the driving position sensed by the GPS receiving unit 40 is not the position after passing through the crossroad, the controller 90 maintains the turned-on state of the left SBL 20 without turning off the left SBL 20 (S40), and when the driving position sensed by the GPS receiving unit 40 is the position after passing through the crossroad, the controller 90 determines whether the steering wheel angle of the steering wheel sensed by the steering wheel angle sensing sensor 80 exceeds the reference angle of 20 degrees (S17). When the steering wheel angle of the steering wheel sensed by the steering wheel angle sensing sensor 80 exceeds 20 degrees, the controller 90 maintains the turned-on state of the left SBL 20 without turning off the left SBL 20 (S40), and when the steering wheel angle of the steering wheel sensed by the steering wheel angle sensing sensor 80 is equal to or smaller than 20 degrees, the controller 90 turns off the left SBL 20 (S20).

Further, after the controller 90 turns on the right SBL (S12), the controller 90 determines whether the driving speed of the automobile sensed by the vehicle sensing sensor 70 is equal to or smaller than the reference speed of 40 km/h (S15), and when the driving speed of the automobile sensed by the vehicle sensing sensor 70 exceeds the reference speed of 40 km/h, the controller 90 determines that the automobile passes through the crossroad and turns off the right SBL 30 (S20).

In the meantime, when the driving speed of the automobile sensed by the vehicle sensing sensor 70 is equal to or smaller than the reference speed of 40 km/h, the controller 90 determines whether the driving position of the automobile sensed by the GPS receiving unit 40 is the predetermined position after passing through the crossroad (S16), and when the driving position of the automobile sensed by the GPS receiving unit 40 is not the position after passing through the crossroad, the controller 90 maintains the turned-on state of the right SBL 30 without turning off the right SBL 30 (S40), and when the driving position of the automobile sensed by the GPS receiving unit 40 is the position after passing through the crossroad, the controller 90 determines whether the steering wheel angle of the steering wheel sensed by the steering wheel angle sensing sensor 80 exceeds the reference angle of 20 degrees (S17). When the steering wheel angle of the steering wheel sensed by the steering wheel angle sensing sensor 80 exceeds 20 degrees, the controller 90 maintains the turned-on state without turning off the right SBL 30 (S40), and when the steering wheel angle of the steering wheel sensed by the steering wheel angle sensing sensor 80 is equal to or smaller than 20 degrees, the controller 90 turns off the right SBL 30 (S20).

Further, after the controller 90 turns on all of the left SBL 20 and the right SBL 30 (S14), the controller 90 determines whether 3 seconds, which is the reference time, elapses after the automobile passes through the crossroad (S18), and when 3 seconds elapses, the controller 90 turns off all of the left SBL 20 and the right SBL 30 (S30), and when 3 seconds does not elapse, the controller 90 maintains the turned-on state of the left SBL 20 and the right SBL 30 (S14).

As described above, according to the head lamp apparatus of the automobile and the method of controlling the same according to the present invention, the left SBL 20 and the right SBL 30 are turned on by reflecting the driving speed of the automobile, so that visibility of the driver is improved.

Further, the left SBL 20 and the right SBL 30 are turned on according to a relative distance reflecting the driving speed of the automobile, not the absolute distance from the driving position of the automobile to the crossroad, so that visibility of the driver is improved.

Further, one of the left SBL 20 and the right SBL 30 is selected and the selected one is turned on before the automobile enters the crossroad in the direction of the driving path linked with the map data stored in the map data storing unit 50, it is possible to decrease unnecessary power consumption.

Those skilled in the art will appreciate that the present invention can be implemented in other detailed embodiments, without departing from the technical spirit and essential features of the invention. Therefore, it should be understood that the above-described embodiments are only illustrative in all aspects, not restrictive. The scope of the present invention should be defined by the accompanying claims rather than the detailed description. Various modifications, additions and substitutions derived from the meaning and scope of the accompanying claims and equivalent concept thereof should be interpreted as being included in the scope of the present invention.

What is claimed is:

1. A head lamp apparatus of an automobile, comprising:
a left light configured to light in a driving direction of the automobile;
a left static bend light (SBL) positioned next to the left light and configured to light to a left side of the driving direction of the automobile;
a right light configured to light in the driving direction of the automobile;
a right static bend light (SBL) positioned next to the right light and configured to light to a right side of the driving direction of the automobile;
an automobile speed sensing sensor configured to sense a driving speed of the automobile;
a global positioning system (GPS) receiving unit configured to receive a driving position of the automobile; and
a controller configured to automatically turn on at least one of the left SBL being turned off and the right SBL being turned off when the driving speed of the automobile sensed by the automobile speed sensing sensor is equal to or smaller than a reference speed and when the driving position of the automobile received by the GPS receiving unit is a predetermined position to enter a crossroad.

2. The head lamp apparatus of claim 1, wherein the predetermined position is a position from which the automobile arrives at the crossroad at the driving speed of the automobile sensed by the automobile speed sensing sensor within a reference time.

3. The head lamp apparatus of claim 1, wherein the controller turns on at least one of the left SBL and the right SBL, and then when the driving speed of the automobile sensed by the automobile speed sensing sensor exceeds the reference speed, the controller turns off at least one of the left SBL and the right SBL.

4. The head lamp apparatus of claim 1, further comprising:
a steering wheel angle sensing sensor configured to sense a steering wheel angle of a steering wheel of the automobile,
wherein the controller turns on at least one of the left SBL and the right SBL, and then when the driving speed of the automobile sensed by the automobile speed sensing sensor is equal to or smaller than the reference speed, the driving position received by the GPS receiving unit is a predetermined position after passing through the crossroad, and the steering wheel angle sensed by the steering wheel angle sensing sensor is equal to or lower than a reference angle, the controller turns off at least one of the left SBL and the right SBL.

5. The head lamp apparatus of claim 1, further comprising:
a map data storing unit in which map data is stored,
wherein the controller extracts data on the crossroad from the map data stored in the map data storing unit.

6. The head lamp apparatus of claim 5, further comprising:
an input unit in which a destination is input, wherein when the destination is input in the input unit, the controller maps a driving path from the driving position received by the GPS receiving unit to the destination input in the input unit with the map data to set the driving path.

7. The head lamp apparatus of claim 1, wherein when a driving path of the automobile is a left turn at the crossroad, the controller turns on only the left SBL.

8. The head lamp apparatus of claim 1, wherein when a driving path of the automobile is a right turn at the crossroad, the controller turns on only the right SBL.

9. The head lamp apparatus of claim 1, wherein when a driving path of the automobile is straight driving at the crossroad, the controller turns on all of the left SBL and the right SBL.

10. The head lamp apparatus of claim 9, wherein when a reference time elapses after the automobile passes through the crossroad, the controller turns off all of the left SBL and the right SBL.

11. A method of controlling a head lamp apparatus of an automobile, in which left and right rights configured to light in a driving direction of the automobile and a left static bend light (SBL) configured to light to a left side of the driving direction of the automobile and a right static bend light (SBL) configured to light to a right side of the driving direction are installed, the method comprising:
  a first operation of sensing a driving speed of the automobile;
  a second operation of receiving a driving position of the automobile; and
  a third operation of automatically turning on at least one of the left SBL being turned off and the right SBL being turned off when the driving speed of the automobile sensed in the first operation is equal to or smaller than a reference speed and when the driving position of the automobile received in the second operation is a predetermined position to enter a crossroad.

12. The method of claim 11, wherein the predetermined position is a position from which the automobile arrives at the crossroad at the driving speed of the automobile sensed in the first operation within a reference time.

13. The method of claim 11, further comprising;
  after the third operation, turning off at least one of the left SBL and the right SBL, when the driving speed of the automobile sensed in the first operation exceeds the reference speed.

14. The method of claim 11, further comprising;
  sensing a steering wheel angle of a steering wheel of the automobile, and
  after the third operation, when the driving speed of the automobile sensed in the first operation is equal to or smaller than the reference speed, the driving position received in the second operation is a predetermined position after passing through the crossroad, and the steering wheel angle is equal to or lower than a reference angle, turning off at least one of the left SBL and the right SBL.

15. The method of claim 11, wherein, in the third operation, data on the crossroad is extracted from map data stored in a map data storing unit.

16. The method of claim 15, further comprising;
  inputting a destination of the automobile,
  wherein in the third operation, when the destination is input, a driving path from the driving position of the automobile received in the second operation to the destination is mapped with the map data to set the driving path.

17. The method of claim 16, wherein in the third operation, when a driving path of the automobile is a left turn at the crossroad, only the left SBL is turned on.

18. The method of claim 16, wherein in the third operation, when the driving path is a right turn at the crossroad, only the right SBL is turned on.

19. The method of claim 16, wherein in the third operation, when the driving path is straight driving at the crossroad, all of the left SBL and the right SBL are turned on.

20. The method of claim 19, wherein when a reference time elapses after the automobile passes through the crossroad, all of the left SBL and the right SBL are turned off.

* * * * *